United States Patent
Gillett, Jr.

(10) Patent No.: US 9,286,298 B1
(45) Date of Patent: Mar. 15, 2016

(54) METHODS FOR ENHANCING MANAGEMENT OF BACKUP DATA SETS AND DEVICES THEREOF

(75) Inventor: Richard Baker Gillett, Jr., Westford, MA (US)

(73) Assignee: F5 Networks, Inc., Seattle, WA (US)

( * ) Notice: Subject to any disclaimer, the term of this patent is extended or adjusted under 35 U.S.C. 154(b) by 503 days.

(21) Appl. No.: 13/273,863

(22) Filed: Oct. 14, 2011

Related U.S. Application Data

(60) Provisional application No. 61/393,194, filed on Oct. 14, 2010.

(51) Int. Cl.
*G06F 17/30* (2006.01)
*G06F 9/44* (2006.01)

(52) U.S. Cl.
CPC ........ *G06F 17/30067* (2013.01); *G06F 9/4418* (2013.01)

(58) Field of Classification Search
CPC .............. G06F 17/30174; G06F 11/00; G06F 11/1471; G06F 11/2038; G06F 11/0784; G06F 12/0813; G06F 17/30067; G06F 3/0608; G06F 3/0601; G06F 12/0246; G06F 8/665; G06F 9/5016; G06F 11/1461; G06F 11/1441; G06F 9/4418; G06F 11/0793; G06F 11/1438; G06F 11/20; G06F 17/00; G06F 17/30; G06F 21/568; G06F 21/575
USPC ................. 707/674, 654, 640, 655, 659, 646, 707/E17.005, E17.01, 822, 613, E17.001, 707/614, 634; 714/6, 4, 7, 13, 57, 15, 20; 711/167, 114, 170, 147, 100, 162, 161, 711/E12.103
See application file for complete search history.

(56) References Cited

U.S. PATENT DOCUMENTS

| | | | |
|---|---|---|---|
| 4,993,030 A | 2/1991 | Krakauer et al. | |
| 5,218,695 A | 6/1993 | Noveck et al. | |
| 5,303,368 A | 4/1994 | Kotaki | |
| 5,410,667 A * | 4/1995 | Belsan ................. | G06F 3/0601 707/999.202 |
| 5,473,362 A | 12/1995 | Fitzgerald et al. | |
| 5,511,177 A | 4/1996 | Kagimasa et al. | |
| 5,537,585 A | 7/1996 | Blickenstaff et al. | |
| 5,548,724 A | 8/1996 | Akizawa et al. | |

(Continued)

FOREIGN PATENT DOCUMENTS

| AU | 2003300350 A1 | 7/2004 |
|---|---|---|
| CA | 2080530 A1 | 4/1994 |

(Continued)

OTHER PUBLICATIONS

Debnath et al.—"ChunkStash: Speeding Up Inline Storage Deduplication Using Flash Memory"—USENIX annual technical conference, 2010—usenix.org—pp. 1-15.*

(Continued)

*Primary Examiner* — Anh Ly
(74) *Attorney, Agent, or Firm* — LeClairRyan, a Professional Corporation

(57) ABSTRACT

A method, non-transitory computer readable medium, and apparatus that enhance management of backup data sets include receiving an operation on a region of a production data set. A corresponding region of a backup data set is marked as having a change state status until the received operation is completed on the region of the production data set and mirrored on a corresponding region of a backup data set.

33 Claims, 4 Drawing Sheets

(56) References Cited

U.S. PATENT DOCUMENTS

| | | | |
|---|---|---|---|
| 5,550,965 A | 8/1996 | Gabbe et al. | |
| 5,583,995 A | 12/1996 | Gardner et al. | |
| 5,586,260 A | 12/1996 | Hu | |
| 5,590,320 A | 12/1996 | Maxey | |
| 5,623,490 A | 4/1997 | Richter et al. | |
| 5,644,698 A * | 7/1997 | Cannon | G06F 11/1461 714/15 |
| 5,649,194 A | 7/1997 | Miller et al. | |
| 5,649,200 A | 7/1997 | Leblang et al. | |
| 5,668,943 A | 9/1997 | Attanasio et al. | |
| 5,692,180 A | 11/1997 | Lee | |
| 5,721,779 A | 2/1998 | Funk | |
| 5,724,512 A | 3/1998 | Winterbottom | |
| 5,806,061 A | 9/1998 | Chaudhuri et al. | |
| 5,832,496 A | 11/1998 | Anand et al. | |
| 5,832,522 A | 11/1998 | Blickenstaff et al. | |
| 5,838,970 A | 11/1998 | Thomas | |
| 5,862,325 A | 1/1999 | Reed et al. | |
| 5,884,303 A | 3/1999 | Brown | |
| 5,889,935 A * | 3/1999 | Ofek et al. | 714/6.23 |
| 5,893,086 A | 4/1999 | Schmuck et al. | |
| 5,897,638 A | 4/1999 | Lasser et al. | |
| 5,901,327 A * | 5/1999 | Ofek | 711/100 |
| 5,905,990 A | 5/1999 | Inglett | |
| 5,917,998 A | 6/1999 | Cabrera et al. | |
| 5,920,873 A | 7/1999 | Van Huben et al. | |
| 5,926,816 A | 7/1999 | Bauer et al. | |
| 5,937,406 A | 8/1999 | Balabine et al. | |
| 5,991,302 A | 11/1999 | Berl et al. | |
| 5,995,491 A | 11/1999 | Richter et al. | |
| 5,999,664 A | 12/1999 | Mahoney et al. | |
| 6,012,083 A | 1/2000 | Savitzky et al. | |
| 6,029,168 A | 2/2000 | Frey | |
| 6,044,367 A | 3/2000 | Wolff | |
| 6,044,444 A * | 3/2000 | Ofek | 711/162 |
| 6,047,129 A | 4/2000 | Frye | |
| 6,072,942 A | 6/2000 | Stockwell et al. | |
| 6,078,929 A | 6/2000 | Rao | |
| 6,085,234 A | 7/2000 | Pitts et al. | |
| 6,088,694 A | 7/2000 | Burns et al. | |
| 6,088,759 A * | 7/2000 | Hasbun | G06F 8/665 707/999.202 |
| 6,088,769 A | 7/2000 | Hasbun et al. | |
| 6,104,706 A | 8/2000 | Richter et al. | |
| 6,128,627 A | 10/2000 | Mattis et al. | |
| 6,128,717 A | 10/2000 | Harrison et al. | |
| 6,161,145 A | 12/2000 | Bainbridge et al. | |
| 6,161,185 A | 12/2000 | Guthrie et al. | |
| 6,181,336 B1 | 1/2001 | Chiu et al. | |
| 6,182,188 B1 * | 1/2001 | Hasbun | G06F 12/0246 711/102 |
| 6,202,071 B1 * | 3/2001 | Keene | G06F 11/2094 707/E17.007 |
| 6,202,156 B1 | 3/2001 | Kalajan | |
| 6,223,206 B1 | 4/2001 | Dan et al. | |
| 6,226,759 B1 * | 5/2001 | Miller | G06F 11/1466 707/999.202 |
| 6,233,648 B1 | 5/2001 | Tomita | |
| 6,237,008 B1 | 5/2001 | Beal et al. | |
| 6,256,031 B1 | 7/2001 | Meijer et al. | |
| 6,282,610 B1 | 8/2001 | Bergsten | |
| 6,289,345 B1 | 9/2001 | Yasue | |
| 6,308,162 B1 | 10/2001 | Ouimet et al. | |
| 6,311,290 B1 * | 10/2001 | Hasbun | G06F 11/0793 707/999.202 |
| 6,324,581 B1 | 11/2001 | Xu et al. | |
| 6,329,985 B1 | 12/2001 | Tamer et al. | |
| 6,339,785 B1 | 1/2002 | Feigenbaum | |
| 6,349,343 B1 | 2/2002 | Foody et al. | |
| 6,370,543 B2 | 4/2002 | Hoffert et al. | |
| 6,374,263 B1 | 4/2002 | Bunger et al. | |
| 6,374,336 B1 * | 4/2002 | Peters et al. | 711/167 |
| 6,389,433 B1 | 5/2002 | Bolosky et al. | |
| 6,393,581 B1 | 5/2002 | Friedman et al. | |
| 6,397,246 B1 | 5/2002 | Wolfe | |
| 6,412,004 B1 | 6/2002 | Chen et al. | |
| 6,438,595 B1 | 8/2002 | Blumenau et al. | |
| 6,466,580 B1 | 10/2002 | Leung | |
| 6,469,983 B2 | 10/2002 | Narayana et al. | |
| 6,477,544 B1 | 11/2002 | Bolosky et al. | |
| 6,487,561 B1 | 11/2002 | Ofek et al. | |
| 6,493,804 B1 | 12/2002 | Soltis et al. | |
| 6,516,350 B1 | 2/2003 | Lumelsky et al. | |
| 6,516,351 B2 | 2/2003 | Borr | |
| 6,542,909 B1 | 4/2003 | Tamer et al. | |
| 6,549,916 B1 | 4/2003 | Sedlar | |
| 6,553,352 B2 | 4/2003 | Delurgio et al. | |
| 6,556,997 B1 | 4/2003 | Levy | |
| 6,556,998 B1 | 4/2003 | Mukherjee et al. | |
| 6,560,230 B1 | 5/2003 | Li et al. | |
| 6,601,101 B1 | 7/2003 | Lee et al. | |
| 6,606,663 B1 | 8/2003 | Liao et al. | |
| 6,612,490 B1 | 9/2003 | Herrendoerfer et al. | |
| 6,654,346 B1 | 11/2003 | Mahalingaiah et al. | |
| 6,697,871 B1 | 2/2004 | Hansen | |
| 6,704,755 B2 | 3/2004 | Midgley et al. | |
| 6,721,794 B2 | 4/2004 | Taylor et al. | |
| 6,728,265 B1 | 4/2004 | Yavatkar et al. | |
| 6,738,357 B1 | 5/2004 | Richter et al. | |
| 6,738,790 B1 | 5/2004 | Klein et al. | |
| 6,742,035 B1 | 5/2004 | Zayas et al. | |
| 6,744,776 B1 | 6/2004 | Kalkunte et al. | |
| 6,748,420 B1 | 6/2004 | Quatrano et al. | |
| 6,754,215 B1 | 6/2004 | Arikawa et al. | |
| 6,757,706 B1 | 6/2004 | Dong et al. | |
| 6,775,673 B2 | 8/2004 | Mahalingam et al. | |
| 6,775,679 B2 | 8/2004 | Gupta | |
| 6,782,450 B2 | 8/2004 | Arnott et al. | |
| 6,801,960 B1 | 10/2004 | Ericson et al. | |
| 6,826,613 B1 | 11/2004 | Wang et al. | |
| 6,839,761 B2 | 1/2005 | Kadyk et al. | |
| 6,847,959 B1 | 1/2005 | Arrouye et al. | |
| 6,847,970 B2 | 1/2005 | Keller et al. | |
| 6,850,997 B1 | 2/2005 | Rooney et al. | |
| 6,868,439 B2 | 3/2005 | Basu et al. | |
| 6,871,245 B2 | 3/2005 | Bradley | |
| 6,880,017 B1 | 4/2005 | Marce et al. | |
| 6,889,249 B2 | 5/2005 | Miloushev et al. | |
| 6,914,881 B1 | 7/2005 | Mansfield et al. | |
| 6,922,688 B1 | 7/2005 | Frey, Jr. | |
| 6,934,706 B1 | 8/2005 | Mancuso et al. | |
| 6,938,039 B1 | 8/2005 | Bober et al. | |
| 6,938,059 B2 | 8/2005 | Tamer et al. | |
| 6,959,373 B2 | 10/2005 | Testardi | |
| 6,961,815 B2 | 11/2005 | Kistler et al. | |
| 6,973,455 B1 | 12/2005 | Vahalia et al. | |
| 6,973,549 B1 | 12/2005 | Testardi | |
| 6,975,592 B1 | 12/2005 | Seddigh et al. | |
| 6,985,936 B2 | 1/2006 | Agarwalla et al. | |
| 6,985,956 B2 | 1/2006 | Luke et al. | |
| 6,986,015 B2 | 1/2006 | Testardi | |
| 6,990,114 B1 | 1/2006 | Erimli et al. | |
| 6,990,547 B2 | 1/2006 | Ulrich et al. | |
| 6,990,667 B2 | 1/2006 | Ulrich et al. | |
| 6,996,841 B2 | 2/2006 | Kadyk et al. | |
| 7,003,533 B2 | 2/2006 | Noguchi et al. | |
| 7,006,981 B2 | 2/2006 | Rose et al. | |
| 7,010,553 B2 | 3/2006 | Chen et al. | |
| 7,013,379 B1 | 3/2006 | Testardi | |
| 7,020,644 B2 | 3/2006 | Jameson | |
| 7,020,669 B2 | 3/2006 | McCann et al. | |
| 7,024,427 B2 | 4/2006 | Bobbitt et al. | |
| 7,039,061 B2 | 5/2006 | Connor et al. | |
| 7,051,112 B2 | 5/2006 | Dawson | |
| 7,054,998 B2 | 5/2006 | Arnott et al. | |
| 7,055,010 B2 | 5/2006 | Lin et al. | |
| 7,072,917 B2 | 7/2006 | Wong et al. | |
| 7,075,924 B2 | 7/2006 | Richter et al. | |
| 7,089,286 B1 | 8/2006 | Malik | |
| 7,111,115 B2 | 9/2006 | Peters et al. | |
| 7,113,962 B1 | 9/2006 | Kee et al. | |
| 7,120,728 B2 | 10/2006 | Krakirian et al. | |
| 7,120,746 B2 | 10/2006 | Campbell et al. | |
| 7,127,556 B2 | 10/2006 | Blumenau et al. | |

(56) References Cited

U.S. PATENT DOCUMENTS

| | | | |
|---|---|---|---|
| 7,133,967 B2 | 11/2006 | Fujie et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,194,579 B2 | 3/2007 | Robinson et al. |
| 7,197,615 B2 | 3/2007 | Arakawa et al. |
| 7,206,863 B1 * | 4/2007 | Oliveira ............... G06F 3/061 709/218 |
| 7,216,264 B1 * | 5/2007 | Glade ............... G06F 3/061 714/4.11 |
| 7,219,260 B1 * | 5/2007 | de Forest et al. ............... 714/15 |
| 7,234,074 B2 | 6/2007 | Cohn et al. |
| 7,236,491 B2 | 6/2007 | Tsao et al. |
| 7,237,076 B2 | 6/2007 | Nakano et al. |
| 7,269,582 B2 | 9/2007 | Winter et al. |
| 7,272,654 B1 | 9/2007 | Brendel |
| 7,280,536 B2 | 10/2007 | Testardi |
| 7,284,150 B2 | 10/2007 | Ma et al. |
| 7,293,097 B2 | 11/2007 | Borr |
| 7,293,099 B1 | 11/2007 | Kalajan |
| 7,293,133 B1 | 11/2007 | Colgrove et al. |
| 7,308,475 B1 | 12/2007 | Pruitt et al. |
| 7,343,398 B1 | 3/2008 | Lownsbrough |
| 7,346,664 B2 | 3/2008 | Wong et al. |
| 7,373,345 B2 | 5/2008 | Carpentier et al. |
| 7,373,520 B1 | 5/2008 | Borthakur et al. |
| 7,383,288 B2 | 6/2008 | Miloushev et al. |
| 7,383,463 B2 * | 6/2008 | Hayden et al. ............... 714/4.11 |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,440,982 B2 | 10/2008 | Lu et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,496,367 B1 | 2/2009 | Ozturk et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,620,775 B1 * | 11/2009 | Waxman ............... G06F 3/0626 709/218 |
| 7,624,109 B2 | 11/2009 | Testardi |
| 7,639,883 B2 | 12/2009 | Gill |
| 7,644,109 B2 | 1/2010 | Manley et al. |
| 7,653,699 B1 | 1/2010 | Colgrove et al. |
| 7,656,788 B2 | 2/2010 | Ma et al. |
| 7,680,836 B2 | 3/2010 | Anderson et al. |
| 7,685,126 B2 | 3/2010 | Patel et al. |
| 7,685,177 B1 | 3/2010 | Hagerstrom et al. |
| 7,689,596 B2 | 3/2010 | Tsunoda |
| 7,694,082 B2 | 4/2010 | Golding et al. |
| 7,711,771 B2 | 5/2010 | Kimos |
| 7,725,763 B2 * | 5/2010 | Vertes et al. ............... 714/6.12 |
| 7,734,603 B1 | 6/2010 | McManis |
| 7,743,031 B1 * | 6/2010 | Cameron et al. ............... 707/649 |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,788,335 B2 | 8/2010 | Miloushev et al. |
| 7,805,470 B2 | 9/2010 | Armangau et al. |
| 7,809,691 B1 | 10/2010 | Karmarkar et al. |
| 7,818,299 B1 | 10/2010 | Federwisch et al. |
| 7,822,939 B1 | 10/2010 | Veprinsky et al. |
| 7,831,639 B1 | 11/2010 | Panchbudhe et al. |
| 7,849,112 B2 | 12/2010 | Mane et al. |
| 7,853,958 B2 | 12/2010 | Mathew et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,886,218 B2 | 2/2011 | Watson |
| 7,889,734 B1 | 2/2011 | Hendel et al. |
| 7,900,002 B2 | 3/2011 | Lyon |
| 7,903,554 B1 | 3/2011 | Manur et al. |
| 7,904,466 B1 | 3/2011 | Valencia et al. |
| 7,913,053 B1 | 3/2011 | Newland |
| 7,937,421 B2 | 5/2011 | Mikesell et al. |
| 7,953,085 B2 | 5/2011 | Chang et al. |
| 7,953,701 B2 | 5/2011 | Okitsu et al. |
| 7,958,347 B1 | 6/2011 | Ferguson |
| 7,984,108 B2 | 7/2011 | Landis et al. |
| 8,005,953 B2 | 8/2011 | Miloushev et al. |
| 8,010,756 B1 | 8/2011 | Linde |
| 8,015,157 B2 | 9/2011 | Kamei et al. |
| 8,046,547 B1 | 10/2011 | Chatterjee et al. |
| 8,074,107 B2 * | 12/2011 | Sivasubramanian et al. .. 714/6.3 |
| 8,103,622 B1 | 1/2012 | Karinta |
| 8,112,392 B1 | 2/2012 | Bunnell et al. |
| 8,171,124 B2 | 5/2012 | Kondamuru |
| 8,180,747 B2 | 5/2012 | Marinkovic et al. |
| 8,195,760 B2 | 6/2012 | Lacapra et al. |
| 8,204,860 B1 | 6/2012 | Ferguson et al. |
| 8,209,403 B2 | 6/2012 | Szabo et al. |
| 8,239,354 B2 | 8/2012 | Lacapra et al. |
| 8,271,751 B2 | 9/2012 | Hinrichs, Jr. |
| 8,306,948 B2 | 11/2012 | Chou et al. |
| 8,326,798 B1 | 12/2012 | Driscoll et al. |
| 8,351,600 B2 | 1/2013 | Resch |
| 8,352,785 B1 | 1/2013 | Nicklin et al. |
| 8,392,372 B2 | 3/2013 | Ferguson et al. |
| 8,396,895 B2 | 3/2013 | Miloushev et al. |
| 8,397,059 B1 | 3/2013 | Ferguson |
| 8,400,919 B1 | 3/2013 | Amdahl et al. |
| 8,417,681 B1 | 4/2013 | Miloushev et al. |
| 8,417,746 B1 * | 4/2013 | Gillett et al. ............... 707/829 |
| 8,433,735 B2 | 4/2013 | Lacapra |
| 8,463,850 B1 | 6/2013 | McCann |
| 8,468,542 B2 | 6/2013 | Jacobson et al. |
| 8,498,951 B1 | 7/2013 | Baluja et al. |
| 8,548,953 B2 | 10/2013 | Wong et al. |
| 8,549,582 B1 | 10/2013 | Andrews et al. |
| 8,572,007 B1 | 10/2013 | Manadhata et al. |
| 8,576,283 B1 | 11/2013 | Foster et al. |
| 8,595,547 B1 * | 11/2013 | Sivasubramanian et al. ............... 714/6.23 |
| 8,620,879 B2 | 12/2013 | Cairns |
| 8,676,753 B2 * | 3/2014 | Sivasubramanian et al. . 707/614 |
| 8,682,916 B2 | 3/2014 | Wong et al. |
| 8,725,692 B1 * | 5/2014 | Natanzon ............... G06F 7/00 707/610 |
| 8,745,266 B2 | 6/2014 | Agarwal et al. |
| 8,954,492 B1 | 2/2015 | Lowell, Jr. |
| 9,020,912 B1 | 4/2015 | Majee et al. |
| 2001/0007560 A1 | 7/2001 | Masuda et al. |
| 2001/0014891 A1 | 8/2001 | Hoffert et al. |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 | 5/2002 | Shima et al. |
| 2002/0065810 A1 | 5/2002 | Bradley |
| 2002/0073105 A1 | 6/2002 | Noguchi et al. |
| 2002/0083118 A1 | 6/2002 | Sim |
| 2002/0087887 A1 | 7/2002 | Busam et al. |
| 2002/0106263 A1 | 8/2002 | Winker |
| 2002/0120763 A1 | 8/2002 | Miloushev et al. |
| 2002/0133330 A1 | 9/2002 | Loisey et al. |
| 2002/0133491 A1 | 9/2002 | Sim et al. |
| 2002/0143909 A1 | 10/2002 | Botz et al. |
| 2002/0147630 A1 | 10/2002 | Rose et al. |
| 2002/0150253 A1 | 10/2002 | Brezak et al. |

(56) References Cited

U.S. PATENT DOCUMENTS

| | | |
|---|---|---|
| 2002/0156905 A1 | 10/2002 | Weissman |
| 2002/0161911 A1 | 10/2002 | Pinckney, III et al. |
| 2002/0178410 A1 | 11/2002 | Haitsma et al. |
| 2002/0188667 A1 | 12/2002 | Kirnos |
| 2002/0194342 A1 | 12/2002 | Lu et al. |
| 2003/0009429 A1 | 1/2003 | Jameson |
| 2003/0012382 A1 | 1/2003 | Ferchichi et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0061240 A1 | 3/2003 | McCann et al. |
| 2003/0065956 A1 | 4/2003 | Belapurkar et al. |
| 2003/0072318 A1 | 4/2003 | Lam et al. |
| 2003/0088671 A1 | 5/2003 | Klinker et al. |
| 2003/0115218 A1 | 6/2003 | Bobbitt et al. |
| 2003/0115439 A1 | 6/2003 | Mahalingam et al. |
| 2003/0128708 A1 | 7/2003 | Inoue et al. |
| 2003/0140210 A1* | 7/2003 | Testardi ......................... 711/203 |
| 2003/0149781 A1 | 8/2003 | Yared et al. |
| 2003/0156586 A1 | 8/2003 | Lee et al. |
| 2003/0159072 A1 | 8/2003 | Bellinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0200207 A1 | 10/2003 | Dickinson |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0017825 A1 | 1/2004 | Stanwood et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0044705 A1 | 3/2004 | Stager et al. |
| 2004/0054748 A1 | 3/2004 | Ackaouy et al. |
| 2004/0054777 A1 | 3/2004 | Ackaouy et al. |
| 2004/0093474 A1 | 5/2004 | Lin et al. |
| 2004/0098383 A1 | 5/2004 | Tabellion et al. |
| 2004/0098595 A1 | 5/2004 | Aupperle et al. |
| 2004/0133577 A1 | 7/2004 | Miloushev et al. |
| 2004/0133606 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0181605 A1 | 9/2004 | Nakatani et al. |
| 2004/0210731 A1 | 10/2004 | Chatterjee et al. |
| 2004/0213156 A1 | 10/2004 | Smallwood et al. |
| 2004/0236798 A1 | 11/2004 | Srinivasan et al. |
| 2004/0250032 A1* | 12/2004 | Ji et al. ......................... 711/162 |
| 2005/0021615 A1 | 1/2005 | Arnott et al. |
| 2005/0027862 A1 | 2/2005 | Nguyen et al. |
| 2005/0050107 A1 | 3/2005 | Mane et al. |
| 2005/0071589 A1* | 3/2005 | Tross et al. .................... 711/162 |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0160243 A1 | 7/2005 | Lubbers et al. |
| 2005/0175013 A1 | 8/2005 | Le Pennec et al. |
| 2005/0187866 A1 | 8/2005 | Lee |
| 2005/0193245 A1* | 9/2005 | Hayden et al. .................. 714/13 |
| 2005/0198501 A1 | 9/2005 | Andreev et al. |
| 2005/0213570 A1 | 9/2005 | Stacy et al. |
| 2005/0213587 A1 | 9/2005 | Cho et al. |
| 2005/0240756 A1* | 10/2005 | Mayer .................... G06F 9/4418 713/2 |
| 2005/0246393 A1 | 11/2005 | Coates et al. |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0045096 A1 | 3/2006 | Farmer et al. |
| 2006/0074922 A1 | 4/2006 | Nishimura |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0112399 A1* | 5/2006 | Lessly .......................... 719/318 |
| 2006/0117048 A1* | 6/2006 | Thind .............. G06F 17/30067 707/E17.01 |
| 2006/0123062 A1 | 6/2006 | Bobbitt et al. |
| 2006/0140193 A1 | 6/2006 | Kakani et al. |
| 2006/0153201 A1 | 7/2006 | Hepper et al. |
| 2006/0167838 A1 | 7/2006 | Lacapra |
| 2006/0179261 A1 | 8/2006 | Rajan |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0206547 A1 | 9/2006 | Kulkarni et al. |
| 2006/0212746 A1 | 9/2006 | Amegadzie et al. |
| 2006/0218135 A1 | 9/2006 | Bisson et al. |
| 2006/0224636 A1 | 10/2006 | Kathuria et al. |
| 2006/0224687 A1 | 10/2006 | Popkin et al. |
| 2006/0230265 A1 | 10/2006 | Krishna |
| 2006/0242179 A1 | 10/2006 | Chen et al. |
| 2006/0259949 A1* | 11/2006 | Schaefer et al. ................. 726/1 |
| 2006/0268692 A1 | 11/2006 | Wright et al. |
| 2006/0268932 A1 | 11/2006 | Singh et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282461 A1 | 12/2006 | Marinescu |
| 2006/0282471 A1 | 12/2006 | Mark et al. |
| 2006/0294164 A1 | 12/2006 | Armangau et al. |
| 2007/0016754 A1* | 1/2007 | Testardi ......................... 711/206 |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0061441 A1 | 3/2007 | Landis et al. |
| 2007/0088702 A1 | 4/2007 | Fridella et al. |
| 2007/0128899 A1* | 6/2007 | Mayer .................... G06F 9/4406 439/152 |
| 2007/0136308 A1 | 6/2007 | Tsirigotis et al. |
| 2007/0139227 A1 | 6/2007 | Speirs, II et al. |
| 2007/0150481 A1 | 6/2007 | Song et al. |
| 2007/0180314 A1 | 8/2007 | Kawashima et al. |
| 2007/0208748 A1 | 9/2007 | Li |
| 2007/0209075 A1 | 9/2007 | Coffman |
| 2007/0226331 A1 | 9/2007 | Srinivasan et al. |
| 2007/0239944 A1* | 10/2007 | Rupanagunta et al. ....... 711/147 |
| 2007/0260830 A1* | 11/2007 | Faibish et al. ................ 711/162 |
| 2008/0046432 A1 | 2/2008 | Anderson et al. |
| 2008/0070575 A1 | 3/2008 | Claussen et al. |
| 2008/0104344 A1* | 5/2008 | Shimozono .......... G06F 11/1441 711/162 |
| 2008/0104347 A1* | 5/2008 | Iwamura et al. .............. 711/162 |
| 2008/0104443 A1 | 5/2008 | Akutsu et al. |
| 2008/0114718 A1 | 5/2008 | Anderson et al. |
| 2008/0177994 A1* | 7/2008 | Mayer .................... G06F 9/4418 713/2 |
| 2008/0189468 A1* | 8/2008 | Schmidt et al. .................. 711/6 |
| 2008/0200207 A1 | 8/2008 | Donahue et al. |
| 2008/0208735 A1 | 8/2008 | Lyon |
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0243769 A1 | 10/2008 | Arbour et al. |
| 2008/0263401 A1 | 10/2008 | Stenzel |
| 2008/0282047 A1 | 11/2008 | Arakawa et al. |
| 2008/0294446 A1 | 11/2008 | Guo et al. |
| 2009/0007162 A1 | 1/2009 | Sheehan |
| 2009/0013138 A1 | 1/2009 | Sudhakar |
| 2009/0019535 A1 | 1/2009 | Mishra et al. |
| 2009/0037500 A1 | 2/2009 | Kirshenbaum |
| 2009/0037975 A1 | 2/2009 | Ishikawa et al. |
| 2009/0041230 A1 | 2/2009 | Williams |
| 2009/0049260 A1* | 2/2009 | Upadhyayula ........ G06F 3/0608 711/162 |
| 2009/0055507 A1 | 2/2009 | Oeda |
| 2009/0055607 A1 | 2/2009 | Schack et al. |

(56) References Cited

U.S. PATENT DOCUMENTS

| | | | |
|---|---|---|---|
| 2009/0077097 A1 | 3/2009 | Lacapra et al. | |
| 2009/0077312 A1* | 3/2009 | Miura | G06F 11/1441 711/113 |
| 2009/0089344 A1 | 4/2009 | Brown et al. | |
| 2009/0094252 A1 | 4/2009 | Wong et al. | |
| 2009/0106255 A1* | 4/2009 | Lacapra et al. | 707/10 |
| 2009/0106263 A1 | 4/2009 | Khalid et al. | |
| 2009/0132616 A1 | 5/2009 | Winter et al. | |
| 2009/0161542 A1 | 6/2009 | Ho | |
| 2009/0187915 A1 | 7/2009 | Chew et al. | |
| 2009/0204649 A1 | 8/2009 | Wong et al. | |
| 2009/0204650 A1 | 8/2009 | Wong et al. | |
| 2009/0204705 A1 | 8/2009 | Marinov et al. | |
| 2009/0210431 A1 | 8/2009 | Marinkovic et al. | |
| 2009/0210875 A1 | 8/2009 | Bolles et al. | |
| 2009/0240705 A1 | 9/2009 | Miloushev et al. | |
| 2009/0240899 A1 | 9/2009 | Akagawa et al. | |
| 2009/0254592 A1 | 10/2009 | Marinov et al. | |
| 2009/0265396 A1 | 10/2009 | Ram et al. | |
| 2009/0313503 A1* | 12/2009 | Atluri et al. | 714/19 |
| 2010/0017643 A1* | 1/2010 | Baba et al. | 714/3 |
| 2010/0030777 A1 | 2/2010 | Panwar et al. | |
| 2010/0061232 A1 | 3/2010 | Zhou et al. | |
| 2010/0082542 A1 | 4/2010 | Feng et al. | |
| 2010/0122248 A1 | 5/2010 | Robinson et al. | |
| 2010/0199042 A1* | 8/2010 | Bates et al. | 711/114 |
| 2010/0205206 A1 | 8/2010 | Rabines et al. | |
| 2010/0211547 A1 | 8/2010 | Kamei et al. | |
| 2010/0325257 A1 | 12/2010 | Goel et al. | |
| 2010/0325634 A1 | 12/2010 | Ichikawa et al. | |
| 2011/0083185 A1 | 4/2011 | Sheleheda et al. | |
| 2011/0087696 A1 | 4/2011 | Lacapra | |
| 2011/0093471 A1 | 4/2011 | Brockway et al. | |
| 2011/0099146 A1* | 4/2011 | McAlister et al. | 707/634 |
| 2011/0099420 A1* | 4/2011 | MacDonald McAlister et al. | 714/6.32 |
| 2011/0107112 A1 | 5/2011 | Resch | |
| 2011/0119234 A1 | 5/2011 | Schack et al. | |
| 2011/0255537 A1 | 10/2011 | Ramasamy et al. | |
| 2011/0296411 A1 | 12/2011 | Tang et al. | |
| 2011/0320882 A1 | 12/2011 | Beaty et al. | |
| 2012/0042115 A1 | 2/2012 | Young | |
| 2012/0078856 A1* | 3/2012 | Linde | 707/679 |
| 2012/0144229 A1 | 6/2012 | Nadolski | |
| 2012/0150699 A1 | 6/2012 | Trapp et al. | |
| 2012/0246637 A1 | 9/2012 | Kreeger et al. | |
| 2013/0007239 A1 | 1/2013 | Agarwal et al. | |
| 2013/0058252 A1 | 3/2013 | Casado et al. | |
| 2013/0058255 A1 | 3/2013 | Casado et al. | |
| 2014/0372599 A1 | 12/2014 | Gutt et al. | |

FOREIGN PATENT DOCUMENTS

| | | |
|---|---|---|
| CA | 2512312 A1 | 7/2004 |
| EP | 0605088 A3 | 2/1996 |
| EP | 0 738 970 A1 | 10/1996 |
| JP | 63010250 A | 1/1988 |
| JP | 6205006 A | 7/1994 |
| JP | 06-332782 | 12/1994 |
| JP | 8-021924 B | 3/1996 |
| JP | 08-328760 | 12/1996 |
| JP | 08-339355 | 12/1996 |
| JP | 9016510 A | 1/1997 |
| JP | 11282741 A | 10/1999 |
| JP | 2000-183935 | 6/2000 |
| NZ | 566291 A | 12/2008 |
| WO | 02/39696 A2 | 5/2002 |
| WO | WO 02/056181 A2 | 7/2002 |
| WO | WO 2004/061605 A2 | 7/2004 |
| WO | 2006091040 A1 | 8/2006 |
| WO | WO 2008/130983 A1 | 10/2008 |
| WO | WO 2008/147973 A2 | 12/2008 |

OTHER PUBLICATIONS

Oracle® Secure Backup Reference Release 10.1 B14236-01 Mar. 2006—pp. 1-456.*

Gupta et al., "Algorithms for Packet Classification", Computer Systems Laboratory, Stanford University, CA Mar./Apr. 2001, pp. 1-29.

Heinz II G., "Priorities in Stream Transmission Control Protocol (SCTP) Multistreaming", Thesis submitted to the Faculty of the University of Delaware, Spring 2003, pp. 1-35.

Internet Protocol,"Darpa Internet Program Protocol Specification", (RFC:791), Information Sciences Institute, University of Southern California, Sep. 1981, pp. 1-49.

Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.

Modiano E., "Scheduling Algorithms for Message Transmission Over a Satellite Broadcast System," MIT Lincoln Laboratory Advanced Network Group, Nov. 1997, pp. 1-7.

Ott D., et al., "A Mechanism for TCP-Friendly Transport-level Protocol Coordination" USENIX Annual Technical Conference, 2002, University of North Carolina at Chapel Hill, pp. 1-12.

Padmanabhan V., et al., "Using Predictive Prefetching to Improve World Wide Web Latency", SIGCOM, 1996, pp. 1-15.

Rosen E., et al., "MPLS Label Stack Encoding", (RFC:3032) Network Working Group, Jan. 2001, pp. 1-22, (http://www.ietf.org/rfc/rfc3032.txt).

Wang B., "Priority and Realtime Data Transfer Over the Best-Effort Internet", Dissertation Abstract, Sep. 2005, ScholarWorks@UMASS.

Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

U.S. Appl. No. 13/770,685, filed Feb. 19, 2013, entitled "System and Method for Achieving Hardware Acceleration for Asymmetric Flow Connections," Inventor H. Cai.

U.S. Appl. No. 12/399,784, filed Mar. 6, 2009, entitled "Method for Managing Storage of a File System and Systems Thereof," Inventor T. Wong.

U.S. Appl. No. 14/041,838, filed Sep. 30, 2013, entitled "Hardware Assisted Flow Acceleration and L2 SMAC Management in a Heterogeneous Distributed Multi-Tenant Virtual Clustered System," Inventor H. Cai.

U.S. Appl. No. 14/194,277, filed Feb. 28, 2014, entitled "Device for Topology Hiding of a Visited Network," Inventor L. Ridel.

Debnath et al. ChunkStash: Speeding up Inline Storage Deduplication using Flash Memory—dated: Oct. 2011 Microsoft Reasearch pp. 1-15.

Oracle Secure Backup Ref. Release 10.1 B14236-01, pp. 1-456 Mar. 2006.

"The AFS File System in Distributed Computing Environment," www.transarc.ibm.com/Library/whitepapers/AFS/afsoverview.html, last accessed on Dec. 20, 2002.

Aguilera, Marcos K. et al., "Improving recoverability in multi-tier storage systems," International Conference on Dependable Systems and Networks (DSN-2007), Jun. 2007, 10 pages, Edinburgh, Scotland.

Anderson, Darrell C. et al., "Interposed Request Routing for Scalable Network Storage," ACM Transactions on Computer Systems 20(1): (Feb. 2002), pp. 1-24.

Anderson et al., "Serverless Network File System," in the 15th Symposium on Operating Systems Principles, Dec. 1995, Association for Computing Machinery, Inc.

Anonymous, "How DFS Works: Remote File Systems," Distributed File System (DFS) Technical Reference, retrieved from the Internet on Feb. 13, 2009: URL<:http://technetmicrosoft.com/en-us/library/cc782417WS.10,printer).aspx> (Mar. 2003).

Apple, Inc., "Mac OS X Tiger Keynote Intro. Part 2," Jun. 2004, www.youtube.com <http://www.youtube.com/watch?v=zSBJwEmRJbY>, p. 1.

Apple, Inc., "Tiger Developer Overview Series: Working with Spotlight," Nov. 23, 2004, www.apple.com using www.archive.org

(56) References Cited

OTHER PUBLICATIONS

<http://web.archive.org/web/20041123005335/developer.apple.com/macosx/tiger/spotlight.html>, pp. 1-6.
"A Storage Architecture Guide," Second Edition, 2001, Auspex Systems, Inc., www.auspex.com, last accessed on Dec. 30, 2002.
Basney et al., "Credential Wallets: A Classification of Credential Repositories Highlighting MyProxy," TPRC 2003, Sep. 19-21, 2003, pp. 1-20.
Botzum, Keys, "Single Sign On—A Contrarian View," Open Group Website, <http://www.opengroup.org/security/topics.htm>, Aug. 6, 2001, pp. 1-8.
Cabrera et al., "Swift: A Storage Architecture for Large Objects," in Proceedings of the-Eleventh IEEE Symposium on Mass Storage Systems, Oct. 1991, pp. 123-128.
Cabrera et al., "Swift: Using Distributed Disk Striping to Provide High I/O Data Rates," Fall 1991, pp. 405-436, vol. 4, No. 4, Computing Systems.
Cabrera et al., "Using Data Striping in a Local Area Network," 1992, technical report No. UCSC-CRL-92-09 of the Computer & Information Sciences Department of University of California at Santa Cruz.
Callaghan et al., "NFS Version 3 Protocol Specifications" (RFC 1813), Jun. 1995, The Internet Engineering Task Force (IETN), www.ietf.org, last accessed on Dec. 30, 2002.
Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.
Cavale, M. R., "Introducing Microsoft Cluster Service (MSCS) in the Windows Server 2003", Microsoft Corporation, Nov. 2002.
"CSA Persistent File System Technology," A White Paper, Jan. 1, 1999, p. 1-3, http://www.cosoa.com/white_papers/pfs.php, Colorado Software Architecture, Inc.
"Distributed File System: A Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.
English Translation of Notification of Reason(s) for Refusal for JP 2002-556371 (Dispatch Date: Jan. 22, 2007).
Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.
Farley, M., "Building Storage Networks," Jan. 2000, McGraw Hill, ISBN 0072120509.
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.
Gibson et al., "NASD Scalable Storage Systems," Jun. 1999, USENIX99, Extreme Linux Workshop, Monterey, California.
Harrison, C., May 19, 2008 response to Communication pursuant to Article 96(2) EPC dated Nov. 9, 2007 in corresponding European patent application No. 02718824.2.
Hartman, J., "The Zebra Striped Network File System," 1994, Ph.D. dissertation submitted in the Graduate Division of the University of California at Berkeley.
Haskin et al., "The Tiger Shark File System," 1996, in proceedings of IEEE, Spring COMPCON, Santa Clara, CA, www.research.ibm.com, last accessed on Dec. 30, 2002.
Hu, J., Final Office action dated Sep. 21, 2007 for related U.S. Appl. No. 10/336,784.
Hu, J., Office action dated Feb. 6, 2007 for related U.S. Appl. No. 10/336,784.
Hwang et al., "Designing SSI Clusters with Hierarchical Checkpointing and Single 1/0 Space," IEEE Concurrency, Jan.-Mar. 1999, pp. 60-69.
International Search Report for International Patent Application No. PCT/US2008/083117 (Jun. 23, 2009).
International Search Report for International Patent Application No. PCT/US2008/060449 (Apr. 9, 2008).
International Search Report for International Patent Application No. PCT/US2008/064677 (Sep. 6, 2009).
International Search Report for International Patent Application No. PCT/US02/00720, Jul. 8, 2004.
International Search Report from International Application No. PCT/US03/41202, mailed Sep. 15, 2005.
Karamanolis, C. et al., "An Architecture for Scalable and Manageable File Services," HPL-2001-173, Jul. 26, 2001. p. 1-114.
Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.
Kimball, C.E. et al., "Automated Client-Side Integration of Distributed Application Servers," 13Th LISA Conf., 1999, pp. 275-282 of the Proceedings.
Klayman, J., Nov. 13, 2008 e-mail to Japanese associate including instructions for response to office action dated May 26, 2008 in corresponding Japanese patent application No. 2002-556371.
Klayman, J., Response filed by Japanese associate to office action dated Jan. 22, 2007 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Kohl et al., "The Kerberos Network Authentication Service (V5)," RFC 1510, Sep. 1993. (http://www.ietf.org/ rfc/rfc1510.txt?number=1510).
Korkuzas, V., Communication pursuant to Article 96(2) EPC dated Sep. 11, 2007 in corresponding European patent application No. 02718824.2-2201.
Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.
Long et al., "Swift/RAID: A distributed RAID System", Computing Systems, Summer 1994, vol. 7, pp. 333-359.
"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.
Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.
Norton et al., "CIFS Protocol Version CIFS-Spec 0.9," 2001, Storage Networking Industry Association (SNIA), www.snia.org, last accessed on Mar. 26, 2001.
Novotny et al., "An Online Credential Repository for the Grid: MyProxy," 2001, pp. 1-8.
Pashalidis et al., "A Taxonomy of Single Sign-On Systems," 2003, pp. 1-16, Royal Holloway, University of London, Egham Surray, TW20, 0EX, United Kingdom.
Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004.Royal Holloway, University of London.
Patterson et al., "A case for redundant arrays of inexpensive disks (RAID)", Chicago, Illinois, Jun. 1-3, 1988, in Proceedings of ACM SIGMOD conference on the Management of Data, pp. 109-116, Association for Computing Machinery, Inc., www.acm.org, last accessed on Dec. 20, 2002.
Pearson, P.K., "Fast Hashing of Variable-Length Text Strings," Comm. of the ACM, Jun. 1990, pp. 1-4, vol. 33, No. 6.
Peterson, M., "Introducing Storage Area Networks," Feb. 1998, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.
Response filed Jul. 6, 2007 to Office action dated Feb. 6, 2007 for related U.S. Appl. No. 10/336,784.
Response filed Mar. 20, 2008 to Final Office action dated Sep. 21, 2007 for related U.S. Appl. No. 10/336,784.

(56) References Cited

OTHER PUBLICATIONS

Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph—p. 868, col. 1, paragraph 1.

RSYNC, "Welcome to the RSYNC Web Pages," Retrieved from the Internet URL: http://samba.anu.edu.ut.rsync/. (Retrieved on Dec. 18, 2009).

Savage, et al., "AFRAID—A Frequently Redundant Array of Independent Disks," Jan. 22-26, 1996, pp. 1-13, USENIX Technical Conference, San Diego, California.

"Scaling Next Generation Web Infrastructure with Content-Intelligent Switching: White Paper," Apr. 2000, p. 1-9 Alteon Web Systems, Inc.

Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.

Soltis et al., "The Global File System," Sep. 17-19, 1996, in Proceedings of the Fifth NASA Goddard Space Flight Center Conference on Mass Storage Systems and Technologies, College Park, Maryland.

Sorenson, K.M., "Installation and Administration: Kimberlite Cluster Version 1.1.0, Rev. Dec. 2000," Mission Critical Linux, http://oss.missioncriticallinux.corn/kimberlite/kimberlite.pdf.

Stakutis, C., "Benefits of SAN-based file system sharing," Jul. 2000, pp. 1-4, InfoStor, www.infostor.com, last accessed on Dec. 30, 2002.

Thekkath et al., "Frangipani: A Scalable Distributed File System," in Proceedings of the 16th ACM Symposium on Operating Systems Principles, Oct. 1997, pp. 1-14, Association for Computing Machinery, Inc.

Tulloch, Mitch, "Microsoft Encyclopedia of Security," 2003, pp. 218, 300-301, Microsoft Press, Redmond, Washington.

Uesugi, H., Nov. 26, 2008 amendment filed by Japanese associate in response to office action dated May 26, 2008 in corresponding Japanese patent application No. 2002-556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

"VERITAS SANPoint Foundation Suite(tm) and SANPoint Foundation Suite(tm) HA: New VERITAS Volume Management and File System Technology for Cluster Environments," Sep. 2001, VERITAS Software Corp.

Wilkes, J., et al., "The HP AutoRAID Hierarchical Storage System," Feb. 1996, vol. 14, No. 1, ACM Transactions on Computer Systems.

"Windows Clustering Technologies—An Overview," Nov. 2001, Microsoft Corp., www.microsoft.com, last accessed on Dec. 30, 2002.

Zayas, E., "AFS-3 Programmer's Reference: Architectural Overview," Transarc Corp., version 1.0 of Sep. 2, 1991, doc. No. FS-00-D160.

\* cited by examiner

Figure 2 – Active/Standby VMCD Cluster

METHODS FOR ENHANCING MANAGEMENT OF BACKUP DATA SETS AND DEVICES THEREOF

This application claims the benefit of U.S. Provisional Patent Application Ser. No. 61/393,194 filed Oct. 14, 2010, which is hereby incorporated by reference in its entirety.

FIELD

This technology relates to methods for enhancing management of backup data sets to support transparent failover and devices thereof.

BACKGROUND

Synchronous mirroring of data sets assures that a backup copy of the data set is always a perfect replica of the current production copy of the data set. Therefore, failover can be performed automatically without human intervention since there is no question about the quality of the backup data.

Unfortunately, synchronous mirroring requires that an application's write be stalled until both the current production data set and the backup data set have been updated. This need to synchronize writes causes unacceptable performance loss in many real-world situations. The performance loss is particularly high when the backup data set is updated over a slow network link such as over a WAN to a cloud storage provider.

Asynchronous mirroring of data sets greatly reduces the performance penalty discussed above. With asynchronous mirroring, an application's write is acknowledged before the backup data set has been updated.

Unfortunately, this relaxed update comes at a cost. At the time of a failover, the backup copy is in an unknown state that may or may not represent the state of the production data at the time of the failover. This uncertainty greatly complicates the failover process. Essentially the challenge comes down to how a storage administrator determines that the quality of the data in the backup data set is "good enough" to support a successful failover.

SUMMARY

A method for enhancing management of backup data sets includes receiving at a virtualization management computing device an operation on a region of a production data set. A corresponding region of a backup data set is marked as having a change state status with the virtualization management computing device until the received operation is completed on the region of the production data set and mirrored on a corresponding region of a backup data set.

A computer readable medium having stored thereon instructions for enhancing management of backup data sets comprising machine executable code which when executed by at least one processor, causes the processor to perform including receiving an operation on a region of a production data set. A corresponding region of a backup data set is marked as having a change state status until the received operation is completed on the region of the production data set and mirrored on a corresponding region of a backup data set.

A virtualization management computing device includes a memory coupled to one or more processors which are configured to execute programmed instructions stored in the memory including receiving an operation on a region of a production data set. A corresponding region of a backup data set is marked as having a change state status until the received operation is completed on the region of the production data set and mirrored on a corresponding region of a backup data set.

This technology provides a number of advantages including providing a method, computer readable medium and apparatus that further enhances management of backup data sets to support transparent failover. This technology reduces the performance penalty associated with the highest-form of mirror data management, i.e. synchronous mirroring, while still maintaining the same assurance of data quality, i.e. never return an incorrect data set. This technology can be utilized with storage virtualization technology, applied to block or file storage, and implemented as part of a file server or integrated with WAN optimization technology. Further, this technology can be utilized with more complex mirror flows, such as mirroring data to another local location synchronously combined with remote change notification by way of example only.

DETAILED DESCRIPTION

Figure 1:
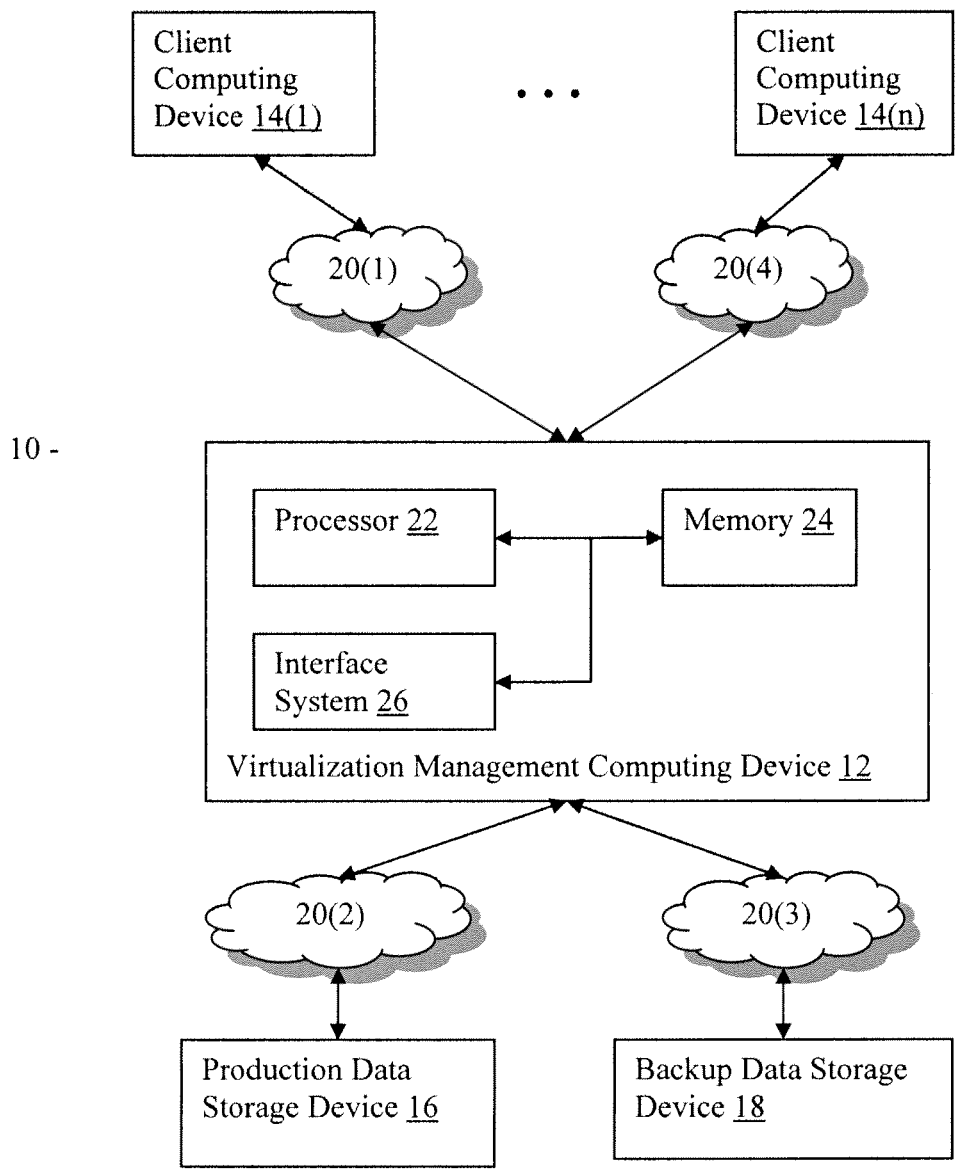
FIG. 1 is a block diagram of an exemplary network environment with enhanced management of backup data sets to support transparent failover.
Figure 2:
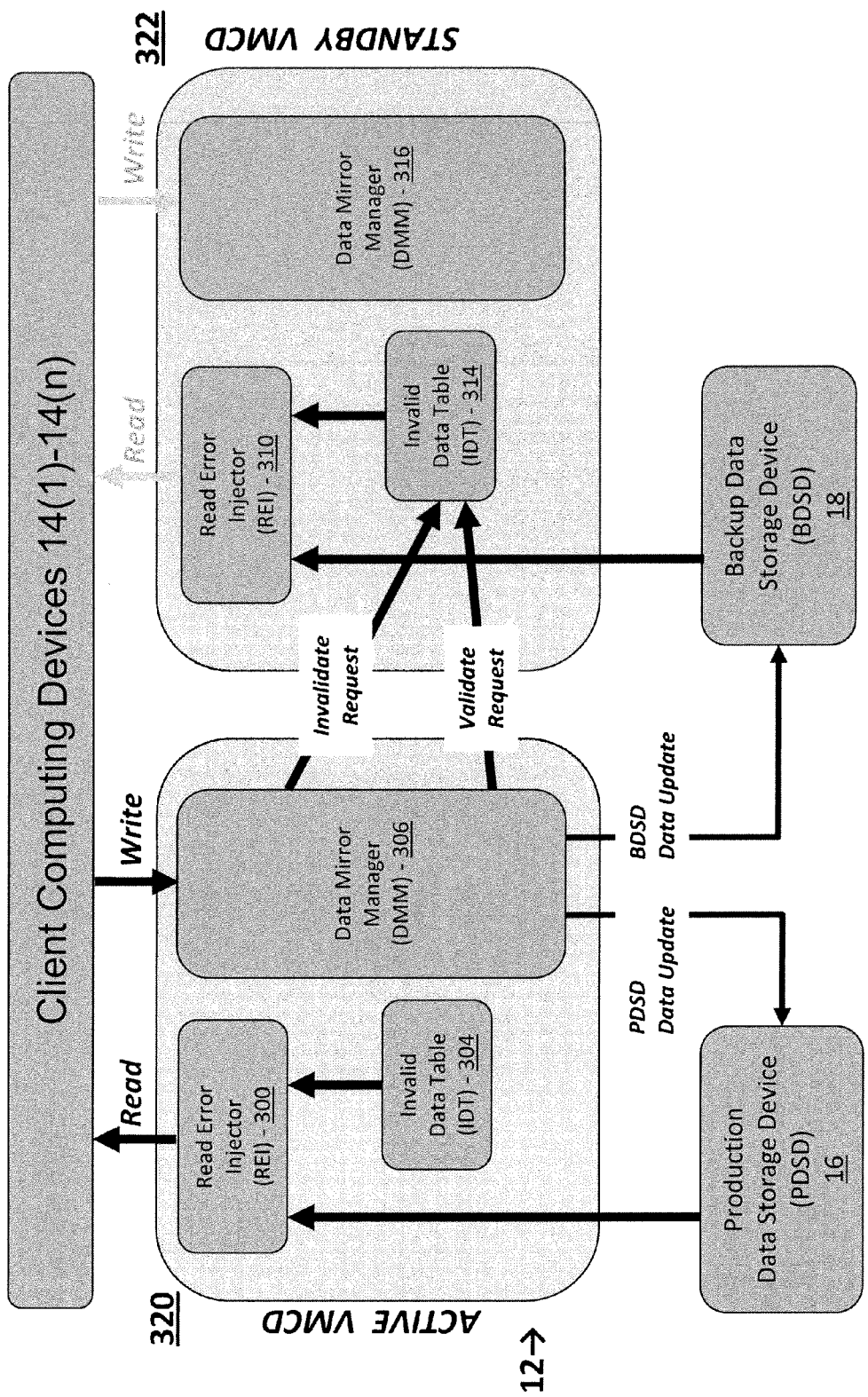
FIG. 2 is a partial block diagram and partial functional diagram of the exemplary environment illustrated in FIG. 1.
Figure 3:
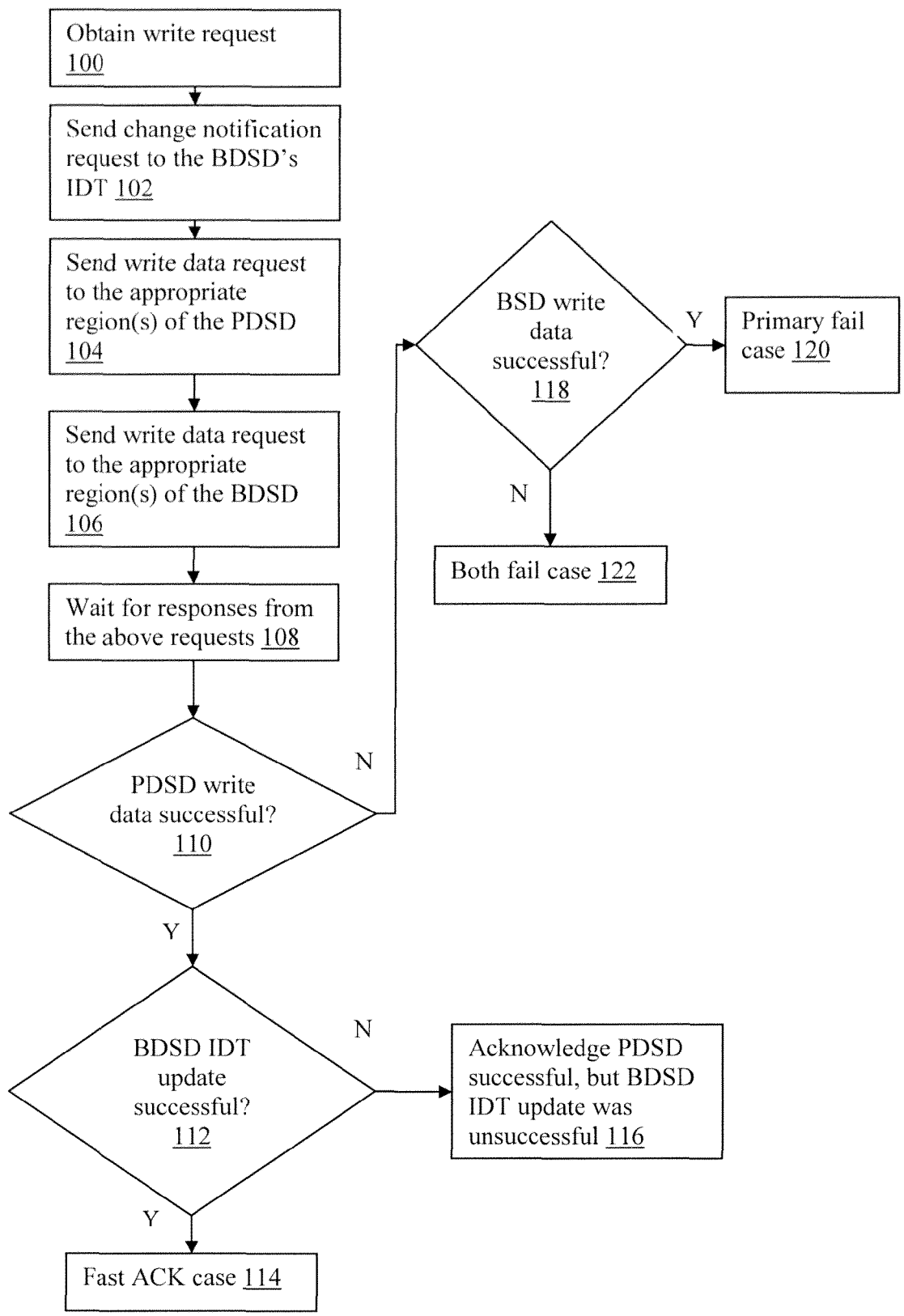
FIG. 3 is a flow chart of an exemplary method for managing a write operation with a production data set and a backup data set.

An exemplary environment 10 in which enhanced management of backup data sets is illustrated in FIGS. 1 and 2. The environment 10 includes a virtualization management computing device or VMCD 12, a plurality of client computing devices or CCD 14(1)-14(n), a production data storage device or PDSD 16, and a backup data storage device or BDSD 18 which are all coupled together by one or more communication networks 20(1)-20(4), although this environment can include other numbers and types of systems, devices, components, and elements in other configurations. This technology provides a number of advantages including providing improved management of backup data sets to support transparent failover.

The virtualization management computing device 12 provides a number of functions including management of backup data sets and virtualized access to these data sets between the client computing devices 14(1)-14(n) and data storage devices 16 and 18, although other numbers and types of systems can be used and other numbers and types of functions can be performed. In this particular example, the virtualization management computing device 12 includes an active VMCD node 320 and a standby VMCD node 322, although for example the active VMCD node and the standby VMCD node could each be in separate computing device. In this example, the virtualization management computing device 12 includes a central processing unit (CPU) or processor 22, a memory 24, and an interface system 26 which are coupled together by a bus or other link, although other numbers and types of systems, devices, components, and elements in other configurations production data storage device 16, and a backup data storage device 18 and locations can be used. The processor 22 executes a program of stored instructions for one or more aspects of the present technology as described and illustrated by way of the examples herein including for the active and standby VMCD nodes, although other types and numbers of processing devices and logic could be used and the processor 22 could execute other numbers and types of programmed instructions.

The memory 24 stores these programmed instructions for one or more aspects of the present technology as described and illustrated herein, although some or all of the programmed instructions could be stored and executed elsewhere. In this particular example, the memory 24 includes for the active VMCD node 320 a read error injector module (REI) 300, an invalid data table (IDT) 304, and a data mirror manager module (DMM) 306 and for the standby VMCD node 322 another read error injector module (REI) 310, another invalid data table (IDT) 314, and another data mirror manager module (DMM) 316 which are described in greater detail herein and in this example are all configured to be in communication with each other, although the memory 24 can comprise other types and numbers of modules, tables, and other programmed instructions and databases. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 22, can be used for the memory 24.

The interface system in the virtualization management computing device 12 is used to operatively couple and communicate between the virtualization management computing device 12 and the client computing devices 14(1)-14(n), the production data storage device 16, and the backup data storage device 18 via one or more of the communications networks 20(1)-20(4), although other types and numbers of communication networks or systems with other types and numbers of connections and configurations can be used. By way of example only, the one or more the communications networks can use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communications protocols, can be used. In the exemplary environment 10 shown in FIGS. 1-2, four communication networks 20(1)-20(4) are illustrated, although other numbers and types could be used.

Each of the client computing devices 14(1)-14(n) utilizes the active VMCD node 320 in the virtualization management computing device 12 to conduct one or more operations with one or more of the production data storage device 16 and the backup data storage device 18, such as to create a file or directory, read or write a file, delete a file or directory, or rename a file or directory by way of example only, although other numbers and types of systems could be utilizing these resources and other types and numbers of functions utilizing other types of protocols could be performed. Each of the production data storage device 16 and the backup data storage device 18 store content, such as files and directories, although other numbers and types of storage systems which could have other numbers and types of functions and store other data could be used.

The client computing devices 14(1)-14(n), the production data storage device 16 and the backup data storage device 18 each include a central processing unit (CPU) or processor, a memory, and an interface or I/O system, which are coupled together by a bus or other link, although each could comprise other numbers and types of elements and component, such as control logic. The client computing devices 14(1)-14(n) may run interface applications, such as Web browsers, that may provide an interface to make requests for and send data to the production data storage device 16 and the backup data storage device 18 via the virtualization management computing device 12, although other types and numbers of applications may be executed. The virtualization management computing device 12 processes requests received from applications executing on client computing devices 14(1)-14(n) for files or directories on one or more of the production data storage device 16 and the backup data storage device 18 and also manages mirroring of data sets and interactions with the production data storage device 16 and the backup data storage device 18 as a result of these operations. The production data storage device 16 and the backup data storage device 18 provide access to stored data sets in response to received requests. Although a production data storage device 16 and a backup data storage device 18 are shown, other types and numbers of data storage devices can be used.

Although an example of the virtualization management computing device 12 with the active VMCD node 320 and the standby VMCD node 322, the plurality of client computing devices 14(1)-14(n), the production data storage device 16, and the backup data storage device 18 are described herein, each of these devices could be implemented in other configurations and manners on one or more of any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

An exemplary method for managing a write operation with a production data set and a backup data set will now be described with reference to FIGS. 1-4. In this illustrative example, initially there are duplicate stored data sets comprising a production data set stored in the production data storage device (PDSD) 16 and a backup data set stored in the backup data storage device (BDSD) 18, although there can be other numbers and types of data sets and storage devices in other configurations.

In step 100, the virtualization management computing device 12 receives a write request from the one of the client computing devices or CCDs 14(1)-14(b) with respect to a region in the product data set, although other types and numbers of operations could be requested and from other sources.

In step 102, the data mirror manager (DMM) 306 in the active VMCD node 320 detects the received write request and sends an invalidate notification to invalid table (IDT) 314. In this example, the invalidate notification includes sufficient information to describe the exact region of the product data set in PDSD 16 that is being modified or added to by the write operation. At some time in future IDT 314 in the standby VMCD 322 will persistently store this invalidate information and then acknowledge the notification from DMM 306. Each region in the backup data set in the NDSD 18 corresponding to an invalidate notification entry stored in the IDT 314 is considered to be in an invalid state, although other types of designations could be used. By way of example only, the list of change notification includes different types of change notifications, although the change notification can include other types or amounts of change notification. By extension, all regions in the backup data set in the BDSD 18 that do not have corresponding invalidate notification entry in IDT 314 are considered to be in a valid state, although other types of designations could be used.

In step 104, DMM 306 sends a write request including the new data to the designated region in the production data set stored at the production data storage device 16, although the new data could be written into other types and numbers of storage devices. At some time in the future PDSD 16 will acknowledge this write request has been successfully performed.

In step 106, DMM 306 sends a write request including the new data to the designated region in the backup data set stored at the backup data storage device 18, although the new data could be written into other types and numbers of behalf for the write operation. At some time in the future BDSD 18 will acknowledge this write request has been successfully performed.

In step 108, DMM 306 waits for incoming responses to the various requests it has issued on behalf of the original write request from one of the client computing devices 14(1)-14(n).

In step 110, the virtualization management computing device 12 determines if the requested write in the production data set in the production data storage device 18 was successful. If in step 110, the virtualization management computing device 12 determines the requested write in the production data set in the production data storage device 16 was successful, then the Yes branch is taken to step 112.

In step 112, the virtualization management computing device 12 determines if the requested update for the received write request in the invalid data table 314 in the standby VMCD 322 was successful. If in step 112, the virtualization management computing device 12 determines the requested update for the received write request in the invalid data table 314 in the standby VMCD 322 was successful, then the Yes branch is taken to step 114. In step 114, the virtualization management computing device 12 transmits the fast acknowledgement or FAST ACK, i.e. an acknowledgement before determining whether the corresponding write to the backup data set in the backup data storage device 18 was successful, to the requesting one of the client computing devices 14(1)-14(n) and then this exemplary method can end. In this example, the successful write to the invalid data table 314 would provide an indication that the data in the corresponding region in the backup data set in the backup data storage device 18 was invalid in case of a failover and request for that data.

If in step 112, the virtualization management computing device 12 determines the requested update for the received write request in the invalid data table 314 in the standby VMCD 322 was unsuccessful, then the No branch is taken to step 116. In step 116, the virtualization management computing device 12 transmits an indication that the write to the production data set in the production data storage device 16 was successful, but that the requested update for the received write request in the invalid data table 314 in the standby VMCD 322 was unsuccessful and then this exemplary method can end, although other manners for handling this type of error could be used depending on the particular administrative need.

If back in step 110, the virtualization management computing device 12 determines the requested write in the production data set in the production data storage device 16 was unsuccessful, then an invalid state is set for that region of the production data set in the invalid data table 304 and the No branch is taken to step 118. In step 118, the virtualization management computing device 12 determines if the requested write in the backup data set in the backup data storage device 18 was successful. If in step 118, the virtualization management computing device 12 determines the requested write in the backup data set in the backup data storage device 18 was successful, then the Yes branch is taken to step 120. In step 120, the virtualization management computing device 12 provides an indication to the requesting one of the client computing devices 14(1)-14(n) that the primary write to the production data set in the PDSD 16 failed, but that the backup write to the backup data set in the BDSD was successful and then this exemplary method can end.

If in step 118, the virtualization management computing device 12 determines the requested write in the backup data set in the backup data storage device 18 was unsuccessful, then the No branch is taken to step 122. In step 122, the virtualization management computing device 12 provides an indication to the requesting one of the client computing devices 14(1)-14(n) that the primary write to the production data set in the PDSD 16 and the backup write to the backup data set in the BDSD were both unsuccessful and then this exemplary method can end.

Figure 4:
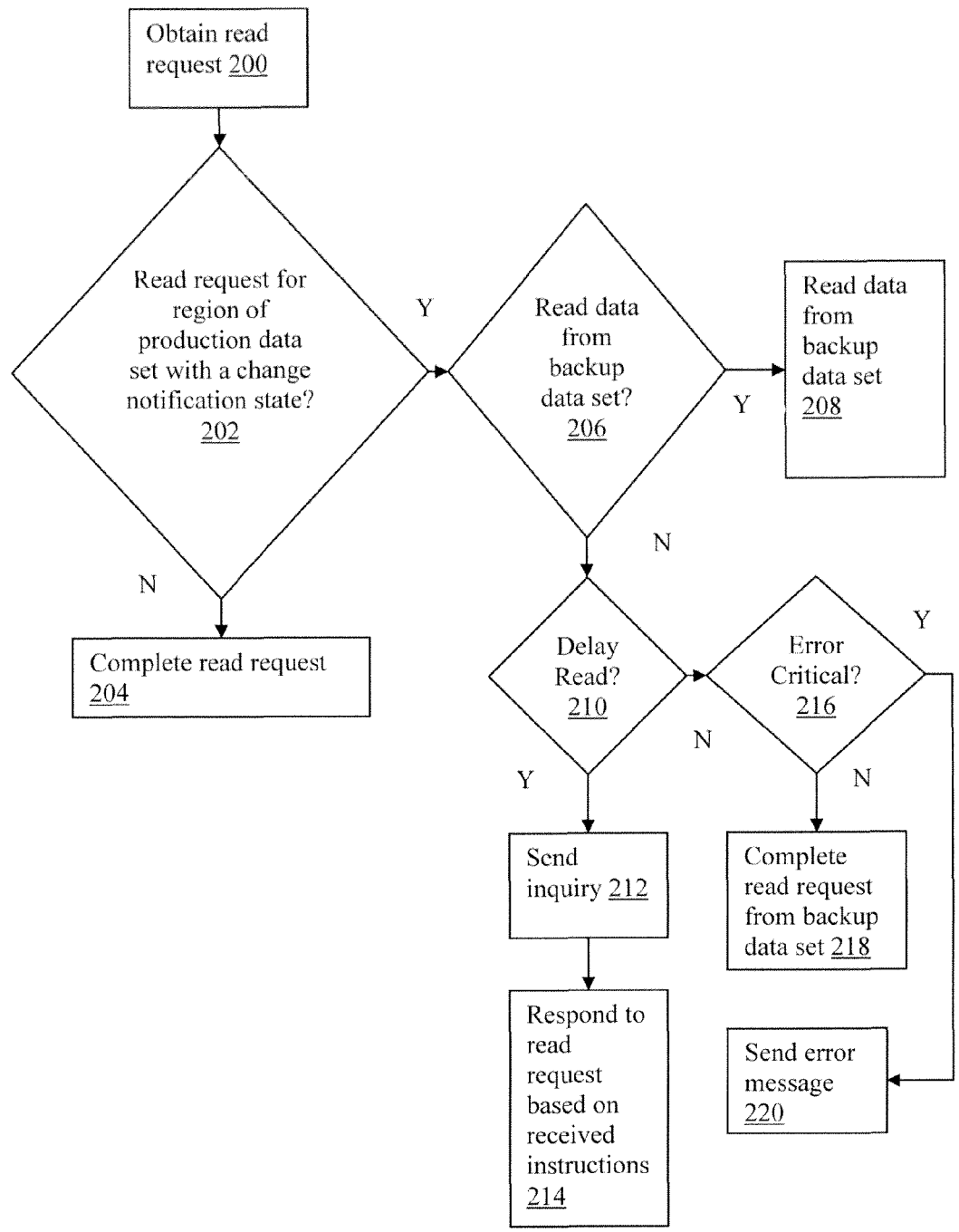
FIG. 4 is a flow chart of an exemplary method for managing a read operation with the production data set and the backup data set with a failover.

An exemplary method for managing a read operation will now be described with reference to FIGS. 1-2 and 4. In step 200 the virtualization management computing device 12 receives a read request from one of the client computing devices 14(1)-14(n), although other types and numbers of operations could be received and from other sources.

In step 202, the read error injector (REI) 300 in the active VMCD node 320 in the virtualization management computing device 12 determines if the received read request is for a region of the production data set in the PDSD 16 with a change notification entry in the IDT 304. If in step 202, the REI 300 in the virtualization management computing device 12 determines the read request is not for a region of the production data set with a change notification entry in the IDT 304, then the No branch is taken to step 204. In step 204, the virtualization management computing device 12 processes the read request and sends a response to the requesting one of the client computing devices 14(1)-14(n).

If back in step 202, the REI in the virtualization management computing device 12 determines the read request is for a region of the production data set in the PDSD 16 with a change notification entry in the IDT 304, then the Yes branch is taken to step 206. In step 206, the read error injector (REI) 300 in the active VMCD node 320 in the virtualization management computing device 12 determines if the received read request is for a region of the backup data set in the BDSD 18 with a change notification entry in the IDT 314. If in step 206, the read error injector (REI) 300 in the active VMCD node 320 in the virtualization management computing device 12 determines the received read request is not for a region of the backup data set in the BDSD 18 with a change notification entry in the IDT 314, then the Yes branch is taken to step 208. For ease of illustration in FIG. 2, not all of the connections between the elements are illustrated, for example the connection between REI 300 and IDT 314 is discussed, but not shown. As noted earlier, in this example read error injector module (REI) 300, invalid data table (IDT) 304, data mirror manager module (DMM) 306, read error injector module (REI) 310, invalid data table (IDT) 314, and another data mirror manager module (DMM) 316 are all configured to be in communication with each other, although other types of configurations can be used. In step 208, the virtualization management computing device 12 responds to the read request from one of the client computing devices 14(1)-14(n) with data from the corresponding region of the backup data set along with a primary fail error to indicate the data in the production data set in the PDSD 16 is invalid, although other manners for responding can be used.

If in step 206, the read error injector (REI) 300 in the active VMCD node 320 in the virtualization management computing device 12 determines the received read request is for a region of the backup data set in the BDSD 18 with a change notification entry in the IDT 314, then the No branch is taken to step 210. In step 210, the virtualization management computing device 12 can provide an indication to the requesting one of the client computing devices 14(1)-14(n) that the requested data in the production data set in the PDSD 16 and the backup data in the backup data set in the BDSD are both invalid, although, other manners for responding can be used and other numbers of optional steps could be executed as discussed below.

In this example, in step 210 the virtualization management computing device 12 optionally determines whether to delay or stall the requested read operation for a first period of time and send an inquiry or other notification to a designated administrator at an administrative computing device with a request for instructions on how to respond to the read operation and error. If in step 210, the virtualization management computing device 12 optionally determines to delay or stall the requested read operation for the first period of time and send an inquiry, then the Yes branch is taken to step 212.

In step 212, the virtualization management computing device 12 sends an inquiry or other notification to a designated administrator at an administrative computing device stored in memory 24 or otherwise designated with a request for instructions on how to respond to the read operation and error. In step 214, the virtualization management computing device 12 obtains a response to the request for instructions on how to respond to the read operation and error from the administrative computing device, processes the read request in accordance with those instructions and then this exemplary method can end.

If back in step 210, the virtualization management computing device 12 optionally determined not to delay or stall the requested read operation for the first period of time and send an inquiry, then the No branch is taken to step 216. In step 216, the virtualization management computing device 12 optionally can determine whether the error with the requested region of the data from the backup data set in the BDSD 18 is critical based on one or more factors. By way of example only, the virtualization management computing device 12 can determine whether the error indicated a corruption rate in the data below a set threshold for the type of data or can determine if the error could be compensated for by executing an error correction application, and then providing the data from the backup data set if the error was not critical.

If in step 216 the virtualization management computing device 12 optionally determines the error with the requested region of data is not critical based on one or more factors, then the No branch is taken to step 218. In step 218, the virtualization management computing device 12 processes the read request to obtain the requested data from the corresponding region in the backup data set in the backup data storage device 18 and provides this data in a response to the requesting one of the client computing devices 14(1)-14(n) and then this exemplary method can end.

If in step 216 the virtualization management computing device 12 optionally determines the error with the requested region of data is critical based on one or more factors, then the Yes branch is taken to step 220. In step 220, the virtualization management computing device 12 sends an error message in a response to the read request to the requesting one of the client computing devices 14(1)-14(n) and then this exemplary method can end.

Accordingly, as illustrated and described herein this technology provides this technology provides a hybrid solution that combines the data quality certainty of synchronous mirroring with the low performance impact of asynchronous mirroring. Additionally, this technology can be used to enhance a globally distributed data caching infrastructure.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, this technology is limited only by the following claims and equivalents thereto.

What is claimed is:

1. A method for enhancing management of backup data sets, the method comprising:
   receiving, by a virtualization management computing device comprising a processor, a request to perform an operation on a region of a production data set;
   marking, by the virtualization management computing device comprising the processor, a region of a backup data set corresponding to the region of the production data set on which the operation will be performed, to indicate a change state status for the marked region of the backup data set; and
   determining, by the virtualization management computing device comprising the processor, when a critical error has occurred in the marked region of the backup data set based on a data corruption rate for the marked region of the backup data set exceeding a set threshold after performance of the operation is completed on the region of the production data set and mirrored on the marked region of the backup data set.

2. The method as set forth in claim 1, further comprising:
executing, by the virtualization management computing device comprising the processor, the received operation on the region of the production data set;
mirroring, by the virtualization management computing device comprising the processor the executed operation on the corresponding region of the backup data set; and
marking, by the virtualization management computing device comprising the processor, the corresponding region of the backup data set as a valid state when the received operation is completed on the region of the production data set and mirrored on the corresponding region of the backup data set.

3. The method as set forth in claim 2 wherein the marking by the virtualization management computing device the corresponding region of the backup data set as valid further comprises:
executing, by the virtualization management computing device comprising the processor, a write operation by the virtualization management computing device to clear the change state status.

4. The method as set forth in claim 1 further comprising:
maintaining, by the virtualization management computing device comprising the processor, one or more tables of change state regions of the production data set and the backup data set.

5. The method as set forth in claim 1 further comprising:
maintaining, by the virtualization management computing device comprising the processor, a list of change notifications.

6. The method as set forth in claim 1, further comprising:
performing, by the virtualization management computing device comprising the processor, error correction on the marked region of the backup data set when the critical error was determined to have occurred.

7. A method for enhancing management of backup data sets, the method comprising:
receiving, by a virtualization management computing device comprising a processor, an operation on a region of a production data set;
marking, by the virtualization management computing device comprising the processor, a corresponding region of a backup data set as having a change state status until the received operation is completed on the region of the production data set and mirrored on the corresponding region of the backup data set;
receiving, by the virtualization management computing device comprising the processor, a read operation to the corresponding region of the backup data set as a result of a failover;
determining, by the virtualization management computing device comprising the processor, an error with respect to the received read operation when the marking indicates the corresponding region of the backup data set has the change state status;
receiving, by the virtualization management computing device comprising the processor, another operation to the corresponding region of the backup data set as a result of a failover; and
executing, by the virtualization management computing device comprising the processor, the received another operation on the corresponding region of the backup data set when the marking indicates the corresponding region of the backup data set is valid.

8. The method as set forth in claim 7 further comprising:
returning, by the virtualization management computing device comprising the processor, an error message with respect to the received read operation when the error is determined.

9. The method as set forth in claim 7 further comprising:
determining, by the virtualization management computing device comprising the processor, when to attempt a recovery from the production data set when the error is determined; and
executing, by the virtualization management computing device comprising the processor, the read operation on the production data set when the determining provides an indication to attempt the recovery.

10. The method as set forth in claim 7 further comprising:
introducing, by the virtualization management computing device comprising the processor, a delay to a response to the read operation for a first period of time when the error is determined; and
providing, by the virtualization management computing device comprising the processor, a request for instructions to a designated administrator error during the first period of time.

11. The method as set forth in claim 7 further comprising:
determining, by the virtualization management computing device comprising the processor, when the error is critical based on one or more factors when the error is determined; and
executing, by the virtualization management computing device comprising the processor, the read operation on the backup data set when the error is determined not to be critical.

12. A non-transitory computer readable medium having stored thereon instructions for enhancing management of backup data sets comprising machine executable code which when executed by at least one processor, causes the processor to perform steps comprising:
receiving a request to perform an operation on a region of a production data set;
marking a region of a backup data set corresponding to the region of the production data set on which the operation will be performed, to indicate a change state status for the marked region of the backup data set; and
determining when a critical error has occurred in the marked region of the backup data set based on a data corruption rate for the marked region of the backup data set exceeding a set threshold after performance of the operation is completed on the region of the production data set and mirrored on the marked region of the backup data set.

13. The medium as set forth in claim 12, further having stored thereon instructions that when executed by the processor cause the processor to perform steps further comprising:
executing the received operation on the region of the production data set;
mirroring the executed operation on the corresponding region of the backup data set; and
marking the corresponding region of the backup data set as a valid state when the received operation is completed on the region of the production data set and mirrored on the corresponding region of the backup data set.

14. The medium as set forth in claim 13 wherein the marking the corresponding region of the backup data set as valid further comprises:
executing a write operation to clear the change state status.

15. The medium as set forth in claim 12 further having stored thereon instructions that when executed by the processor cause the processor to perform steps further comprising:
maintaining one or more tables of change state status regions of the production data set and the backup data set.

16. The medium as set forth in claim 12 further having stored thereon instructions that when executed by the processor cause the processor to perform steps further comprising:
maintaining a list of change notifications.

17. The medium as set forth in claim 12, further having stored thereon instructions that when executed by the processor cause the processor to perform steps further comprising:
performing error correction on the marked region of the backup data set when the critical error was determined to have occurred.

18. A non-transitory computer readable medium having stored thereon instructions for enhancing management of backup data sets comprising machine executable code which when executed by at least one processor, causes the processor to perform steps comprising:
receiving an operation on a region of a production data set;
marking a corresponding region of a backup data set as having a change state status until the received operation is completed on the region of the production data set and mirrored on the corresponding region of the backup data set;
receiving a read operation to the corresponding region of the backup data set as a result of a failover;
determining an error with respect to the received read operation when the marking indicates the corresponding region of the backup data set has the change state status;
receiving another operation to the corresponding region of the backup data set as a result of a failover; and
executing the received another operation on the corresponding region of the backup data set when the marking indicates the corresponding region of the backup data set is valid.

19. The medium as set forth in claim 18 further having stored thereon instructions that when executed by the processor cause the processor to perform steps further comprising:
returning an error message with respect to the received read operation when the error is determined.

20. The medium as set forth in claim 18 further having stored thereon instructions that when executed by the processor cause the processor to perform steps further comprising:
determining when to attempt a recovery from the production data set when the error is determined; and
executing the read operation on the production data set when the determining provides an indication to attempt the recovery.

21. The medium as set forth in claim 18 further having stored thereon instructions that when executed by the processor cause the processor to perform steps further comprising:
introducing a delay to a response to the read operation for a first period of time when the error is determined; and
providing a request for instructions to a designated administrator error during the first period of time.

22. The medium as set forth in claim 18 further having stored thereon instructions that when executed by the processor cause the processor to perform steps further comprising:
determining when the error is critical based on one or more factors when the error is determined; and
executing the read operation on the backup data set when the error is determined not to be critical.

23. A virtualization management computing device comprising:
one or more processors;
a memory coupled to the one or more processors which are configured to be capable of executing programmed instructions, which comprise the programmed instructions stored in the memory to:
receive a request to perform an operation on a region of a production data set;
mark a region of a backup data set corresponding to the region of the production data set on which the operation will be performed, to indicate a change state status for the marked region of the backup data set; and
determine when a critical error has occurred in the marked region of the backup data set based on a data corruption rate for the marked region of the backup data set exceeding a set threshold after performance of the operation is completed on the region of the production data set and mirrored on the marked region of the backup data set.

24. The device as set forth in claim 23, wherein the one or more processors is further configured to be capable of executing programmed instructions, which comprise the programmed instructions stored in the memory to:
execute the received operation on the region of the production data set;
mirror the executed operation on the corresponding region of the backup data set; and
mark the corresponding region of the backup data set as a valid state when the received operation is completed on the region of the production data set and mirrored on the corresponding region of the backup data set.

25. The device as set forth in claim 24 wherein the one or more processors is further configured to be capable of executing programmed instructions, which comprise the programmed instructions stored in the memory to:
mark the corresponding region of the backup data set as valid further comprising executing a write operation to clear the change state status.

26. The device as set forth in claim 23 wherein the one or more processors is further configured to be capable of executing programmed instructions comprising and stored in the memory to:
maintain one or more tables of change state status regions of the production data set and the backup data set.

27. The device as set forth in claim 23 wherein the one or more processors is further configured to be capable of executing programmed instructions comprising and stored in the memory to:
maintain a list of change notifications.

28. The device as set forth in claim 23, wherein the one or more processors is further configured to be capable of executing programmed instructions comprising and stored in the memory to:
perform error correction on the marked region of the backup data set when the critical error was determined to have occurred.

29. A virtualization management computing device comprising:
one or more processors;
a memory coupled to the one or more processors which are configured to be capable of executing programmed instructions comprising and stored in the memory to:
receive an operation on a region of a production data set;
mark a corresponding region of a backup data set as having a change state status until the received operation is completed on the region of the production data set and mirrored on the corresponding region of the backup data set;

receive a read operation to the corresponding region of the backup data set as a result of a failover and determine an error with respect to the received read operation when the marking indicates the corresponding region of the backup data set has the change state status;

receive another operation to the corresponding region of the backup data set as a result of a failover; and execute the received another operation on the corresponding region of the backup data set when the marking indicates the corresponding region of the backup data set is valid.

30. The device as set forth in claim 29 wherein the one or more processors is further configured to be capable of executing programmed instructions comprising and stored in the memory to:

return an error message with respect to the received read operation when the error is determined.

31. The device as set forth in claim 29 wherein the one or more processors is further configured to be capable of executing programmed instructions comprising and stored in the memory to:

determine when to attempt a recovery from the production data set when the error is determined; and execute the read operation on the production data set when the determining provides an indication to attempt the recovery.

32. The device as set forth in claim 29 wherein the one or more processors is further configured to be capable of executing programmed instructions comprising and stored in the memory to:

delay a response to the read operation for a first period of time when the error is determined; and provide a request for instructions to a designated administrator error during the first period of time.

33. The device as set forth in claim 29 wherein the one or more processors is further configured to be capable of executing programmed instructions comprising and stored in the memory to:

determine when the error is critical based on one or more factors when the error is determined; and execute the read operation on the backup data set when the error is determined not to be critical.

\* \* \* \* \*